United States Patent
Schardl, Jr. et al.

(10) Patent No.: US 6,812,286 B2
(45) Date of Patent: Nov. 2, 2004

(54) CLEAR IMPACT-RESISTANT SYNDIOTACTIC POLYPROPYLENE

(75) Inventors: Joseph M. Schardl, Jr., Cypress, TX (US); Likuo Sun, Houston, TX (US); Al Baumgartner, Powder Springs, GA (US); Kevin Boyle, Kingwood, TX (US); Greg Dekunder, Pearland, TX (US)

(73) Assignee: Fina Technology, Inc., Houston, TX (US)

(*) Notice: Subject to any disclaimer, the term of this patent is extended or adjusted under 35 U.S.C. 154(b) by 0 days.

(21) Appl. No.: 10/222,552

(22) Filed: Aug. 15, 2002

(65) Prior Publication Data

US 2004/0034167 A1 Feb. 19, 2004

(51) Int. Cl.[7] .......................... C08F 8/00; C08L 23/00; C08L 23/04; H05B 6/00
(52) U.S. Cl. ................. 525/191; 525/197; 525/240; 264/464; 264/478
(58) Field of Search ............................ 525/191, 197, 525/240; 264/464, 478

(56) References Cited

U.S. PATENT DOCUMENTS 5,792,549 A * 8/1998 Wilkie ........................ 428/215
5,854,347 A * 12/1998 Laurin et al. ................. 525/66
6,451,426 B2 * 9/2002 Kong et al. ............ 428/355 EN

* cited by examiner

*Primary Examiner*—Nathan M. Nutter
(74) *Attorney, Agent, or Firm*—Madan, Mossman & Sriram, P.C.

(57) ABSTRACT

Syndiotactic polypropylene blends having a unique set of mechanical properties may be prepared by blending syndiotactic polypropylene with an ultra low density polyethylene and, optionally, an isotactic polypropylene random copolymer. The syndiotactic polypropylene blends of the present invention have been found to have improved impact strength, reduced haze, increased light transmittance, and reduced flexural modulus. It has been determined that the addition of about 10 to about 50 wt % of an ultra low density polyethylene plastomer to a syndiotactic polypropylene can greatly enhance mechanical toughness, particularly at low temperatures, while maintaining good optical clarity. These results are made possible by using a sPP material with good optical clarity and dispersing the ULDPE plastomer uniformly throughout the sPP matrix to act as a sort of impact modifier. Moreover, the addition of about 10 to about 50 wt % of an iPP random copolymer to the sPP matrix phase provides comparable or improved mechanical properties while also resulting in a significant reduction in injection molding cycle times. The syndiotactic polypropylene blends according to the present invention may be further processed according to accepted practices to make cast films, blown films, co-extruded films, laminated sheets, injection molded parts, blow molded containers, and other articles using basic plastic fabrication techniques as known in the art.

20 Claims, No Drawings

CLEAR IMPACT-RESISTANT SYNDIOTACTIC POLYPROPYLENE

CROSS-REFERENCE TO RELATED APPLICATIONS

This application is related to commonly owned U.S. patent application Ser. No. 10/222,551, entitled "Modification Of Syndiotactic Polypropylene With Mineral Oil", filed on the same date as the present application and incorporated by reference herein.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to syndiotactic polypropylene blends having good optical clarity and an increased level of impact-resistance or improved mechanical toughness. More particularly, the present invention relates to a syndiotactic polypropylene (sPP) which has been blended with an ultra low density polyethylene (ULDPE) and, optionally, a random copolymer of isotactic polypropylene (iPP) and ethylene. Additionally, the syndiotactic polypropylene blend of the present invention may be subsequently formed into films, sheets, molded articles or the like.

BACKGROUND OF THE INVENTION

Polypropylene materials, formed by Ziegler-Natta or metallocene catalysts, are among the most versatile and commonly used thermoplastics in the world today. Polypropylene materials are useful in creating a great variety of finished goods including cast and blown films, injection molded parts, blow molded articles, thermoformed sheets, and fibers which may be subsequently spun or woven to create carpet and other finished goods. Although both polyethylene and polypropylenes are types of polyolefins, polypropylenes tend to be stiffer and exhibit higher yield stresses and melting points in comparison with polyethylenes but are also more prone to fracture, especially at low temperatures. This primarily results from higher glass transition temperatures and may be addressed by producing a toughened blend using rubber or other polymeric impact modifiers to improve low temperature impact resistance at some sacrifice in modulus.

As noted earlier, nearly all commercial grade polypropylenes are produced using either Ziegler-Natta or metallocene catalysts mechanisms. These catalysts allow a certain degree of control in regard to the polypropylene's tacticity or arrangement of methyl groups extending from the carbon chain backbone of the finished polymer. A polypropylene molecule having a random arrangement of these pendant groups would be known as atactic. Whereas a polypropylene chain which always located the pendant group on the same side of the chain or in the same orientation would be known as isotactic, and one in which the pendant group alternated from one side of the chain to the other in a repeating pattern would be referred to as syndiotactic.

Traditionally, commercial polypropylenes have been isotactic as these tend to exhibit greater strength and stiffness in the finished product. However, relatively recent innovations in catalyst chemistry have enabled relatively large scale operations for the production of syndiotactic polypropylene. Although not as strong or as stiff as isotactic polypropylenes, syndiotactic polypropylenes offer a unique set of properties including greater flexibility, higher resistance to impact, and superior optical clarity.

There are a number of unique applications which are ideally suited to strong, flexible and substantially clear polyolefins. By way of example only, plasticized polyvinyl chloride (PVC) has traditionally been used either alone or with other polymer components to form a number of medical articles including bandages, surgical dressings, and intravenous (IV) solution bags. Plasticized PVC films possess many desirable properties including easy stretch, high degree of recovery, low fatigue and minimal permanent set. However, plasticized PVC film has become less desirable because of know or suspected carcinogens associated with both the PVC monomer and the various plasticizers used in its production. Clearly, in medical articles, food storage containers, and other applications where polymers are either in direct contact with blood or other bodily fluids or in contact with food or other items which are to be ingested or taken into the body, it would be desirable to replace materials like plasticized PVC film with various polyolefins, particularly those with very low extractable contents.

Although syndiotactic polypropylene offers superior strength and optical clarity in comparison with less expensive polyolefins, namely polyethylene, sPP homopolymer is typically lacking in mechanical toughness and impact strength at relatively low temperatures. Additionally, while it is possible to produce polypropylene copolymers which exhibit improved cold temperature impact strengths, these materials do not offer the same amount of optical clarity as sPP homopolymer. Accordingly, there is need for syndiotactic polypropylene blends which offer improved mechanical toughness and cold temperature impact resistance while offering optical clarity levels which are comparable to or better than many sPP homopolymers.

SUMMARY OF THE INVENTION

Syndiotactic polypropylene blends prepared in accordance with the present invention address the needs set forth hereinabove and present a rather unique set of mechanical properties by blending syndiotactic polypropylene with an ultra low density polyethylene and, optionally, an isotactic polypropylene random copolymer. In short, the syndiotactic polypropylene blends of the present invention have been found to have improved impact strength, reduced haze, increased light transmittance, and reduced flexural modulus.

More specifically, it has been determined that the addition of about 10 to about 50 wt % of an ultra low density polyethylene plastomer to a syndiotactic polypropylene can greatly enhance mechanical toughness, particularly at low temperatures, while maintaining good optical clarity. These results are made possible by using a sPP material with good optical clarity and dispersing the ULDPE plastomer uniformly throughout the sPP matrix to act as a sort of impact modifier. Moreover, the addition of about 10 to about 50 wt % of an iPP random copolymer to the sPP matrix phase provides comparable or improved mechanical properties while also resulting in a significant reduction in injection molding cycle times.

It is further within the scope of the present invention to provide a method of making syndiotactic polypropylene blends offering improved impact strength and good optical clarity. This may be done by providing a syndiotactic polypropylene material in the form of pellets or fluff and mechanically compounding or blending this material with an ultra low density polyethylene, an iPP random copolymer, or both. This compounding step may be carried out by tumble blending the sPP fluff with the ULDPE pellets and/or the iPP random copolymer, and subsequently feeding this mixture into an extruder or the like to mechanically shear the components into a fairly uniform molten polymer blend. Following extrusion, the syndiotactic polypropylene blends according to the present invention may be further processed according to accepted practices to make cast films, blown films, co-extruded films, laminated sheets, injection molded parts, blow molded containers, and other articles using basic plastic fabrication techniques as known in the art.

BRIEF DESCRIPTION OF THE DRAWINGS

Not applicable.

DETAILED DESCRIPTION OF THE PREFERRED EMBODIMENTS

Syndiotactic polypropylene blends produced in accordance with the present invention may be used as a single layer or as a component in a multiple layer structure which will result in the production of films that exhibit improved mechanical toughness, particularly at lower temperatures, and good optical clarity. The films produced from these blends are also expected to exhibit low extractable levels, possibly making them suitable for use in food or medical packaging. In addition, these materials may be used to manufacture articles with improved mechanical toughness and optical clarity via injection molding, thermoforming and other basic plastic fabrication techniques as known to those skilled in the art.

In accordance with the present invention, the blending of sPP with ultra low density polyethylene plastomers will be shown to improve sPP mechanical toughness while maintaining or slightly improving optical clarity. It will also be shown that sPP blends containing an iPP random copolymer may result in decreased cycle times in injection molding applications in comparison to sPP blends without the iPP copolymer component. The sPP blends containing ULDPE plastomer and, optionally, iPP random copolymer will be shown to have reduced flexural modulus which, in turn, produces a polymer film having improved softness and drapability. Note that enhancement to the mechanical toughness or impact properties of the sPP blends may be made with the addition of ultra low density metallocene polyethylenes, both with and without the use of iPP random copolymer, and this optional material is generally incorporated to reduce injection molding cycle times and increase processibility of the final polymer blend.

The experimental compounds produced in accordance with the present invention were made using a syndiotactic polypropylene, either EOD 93-06 or EOD 95-05 which have been discontinued and may be replaced by a similar sPP presently marketed as FINAPLAS 1471 (4.1 grams per 10 minutes melt flow rate) available from ATOFINA Petrochemicals of LaPorte, Tex. An ultra low density polyethylene such as ENGAGE 8150 or ENGAGE 8200, both available from DuPont Dow Elastomers of Wilmington, Del., is then mechanically incorporated into the sPP for additional low temperature toughness and other favorable characteristics. Optionally, an iPP/PE random copolymer such as 6671XBB (98% propylene/2% ethylene, with a melt flow of 11 g/0 min.) or Z9470 (94% propylene/6% ethylene, with a melt flow of 5 g/10 min.), both available from ATOFINA Petrochemicals, may also be mixed with the sPP to reduce injection molding cycle times in the resulting blends. These syndiotactic polypropylene blends were subsequently injection molded into step chips, tensile bars, Izod bars and plaques for physical testing. The primary objective of these experiments was to increase impact strength values while retaining good optical clarity in the polymer blend.

It should be noted that EOD 93-06 and EOD 95-05 shall be referred to throughout this document as sPP homopolymers, but these polymers are in fact a random copolymers of sPP with a very small amount of ethlylene. The ethylene content of these materials is less than about 1 wt % of the total polymer composition and as such they behave very much like sPP homopolymers in regard to most physical properties. However, the melt temperature ($T_m$) of these materials are slightly less than that required by FDA regulations (see 21 CFR 177.1520) for a pure sPP homopolymer. Although referring to EOD 93-06 or 95-05 as an sPP homopolymer, it is believed that the modification of sPP with ULDPE according to the present invention may be accomplished with pure sPP homopolymer or with copolymers of sPP containing ethylene or various alpha olefins raging from C4–C 12 up to about 10 wt %, but preferably less than about 1 wt %. The sPP materials selected should have densities in a range of about 0.85 to about 0.90 g/ml and melt indices of about 0.1 to about 100 g/10 min. Unless noted to the contrary, the term sPP homopolymer will be understood to include both pure sPP homopolymers and sPP copolymers containing less than about 1 wt % of various alpha olefins. Likewise, ULDPE is also understood to be an ethylene copolymer having densities in a range of about 0.85 to about 0.93 g/ml and melt indices of about 0.25 to about 50 g/10 min. Accordingly, other very low density ethylene copolymers or plastomers having these physical attributes with be considered ULDPE materials as defined herein.

Referring now to Table 1, a variety of mechanical property data including Gardner drop impact, Izod notched impact, flexural modulus, and optical clarity has been collected for a number of polypropylene copolymers and blends. As noted earlier, most commercial grade polypropylenes are isotactic as these tend to provide the greatest strength and stiffness in finished products. Although isotactic polypropylene is one of the most versatile materials, it is not intrinsically tough at or below its glass transition temperature, nor is it particularly clear when formed into somewhat thicker parts. The cold impact performance of iPP can be greatly improved by the incorporation of polyethylene either by blending or by in-situ synthesis. A mechanical blend formed of isotactic polypropylene and polyethylene may be used to provide a less expensive option to an impact copolymer for use in less stringent environments. As indicated in Table 1, the iPP/PE blend available commercially as Solvay 5801, exhibits improved Gardner drop impact (ASTM D5420) values at low temperatures, equivalent or slightly improved notched Izod impact resistance, but inferior optical properties compared to an iPP homopolymer such as Fina 3576uX.

outstanding cold impact performance. In fact, the sPP clear impact resin performed significantly better than both the medium and high impact copolymers which are commercially available from ATOFINA Petrochemicals and Polybrazil. The room temperature and cold temperature impact strength values, in both Gardner drop and notched Izod testing, were superior to both of the impact copolymers tested. Moreover, in regard to optical properties, the sPP clear impact resin was equivalent or slightly better than the

TABLE 1

| Gardner drop impact on 1/8" plaques (in-lb) | iPP Homo-Polymer Fina 3576uX | iPP/PE Blend Solvay 5081 | Medium Impact Copolymer Petrofina 5660G | High Impact Copolymer Polybrazil PEX 28007 | sPP Homo-polymer | sPP clear Impact Resin |
|---|---|---|---|---|---|---|
| @ 23° C. | 39 | 172 | 203 | 192 | 230 | 240 |
| @ 4.4° C. | 3 | 55 | — | — | | |
| @ −25° C. | — | — | 174 | 185 | <4 | 220 |
| Izod impact, notched (ft-lb/in) | | | | | | |
| @ 23° C. | 0.35 | 0.35 | 1.34 | 3.84 | 14.3 | 14.9 |
| @ 4.4° C. | 0.27 | 0.36 | — | — | | |
| @ 0° C. | — | | 0.90 | 1.80 | 0.59 | 11.0 |
| @ −25° C. | | | 0.52 | 0.81 | | 1.1 |
| Flexural modulus ($10^5$ psi) | 1.73 | 1.58 | 1.34 | 0.83 | 0.52 | 0.28 |
| % Light transmittance 1/8" plaques | 73 | 64 | 53 | 50 | 84.7 | 85.5 |
| % Haze 1/16" plaques | | | | | 20.4 | 7.1 |

Still referring Table 1, two commercially available iPP/PE impact copolymers were also tested and evaluated. The first of these was the medium impact copolymer sold as Petrofina 5660G, available form ATOFINA Petrochemicals of LaPort, Tex., and the second material was the high impact copolymer sold as Prolen PEX 28007, available form Polybrazil of Brazil. It is notable that the impact copolymers possess greatly improved Gardner drop and Izod impact strength values both at room temperature and cold temperatures in comparison to the iPP homopolymer. However, both of the iPP/EP impact copolymers have a rather hazy, translucent appearance. This is exhibited by the relatively low light transmittance values for a 1/8 inch thick plaque. As shown in Table 1, the measured light transmittance values were only about 50%.

Still referring to Table 1, by way of comparison, an sPP homopolymer and an sPP clear impact resin produced in accordance with the present invention were also evaluated. The sPP homopolymer was EOD 93-06 and the sPP clear impact resin was produced by physically blending 80 wt % of EOD 93-06 and 20 wt % of a metallocene ULDPE plastomer, namely ENGAGE 8150. As noted in Table 1, the sPP homopolymer has good toughness at room temperature and outstanding optical properties as measured by light transmittance through a 1/8 inch plaque. However, at reduced temperatures, the sPP homopolymer exhibits little or no resistance in both Gardner drop and notched Izod impact testing. In contrast, the sPP clear impact resin exhibits sPP homopolymer on light transmittance and exhibited a substantial improvement in haze percentage for a 1/16 inch plaque.

Another approach to producing an optically clear and impact resistance polypropylene resin may be considered by first blending isotactic polypropylene and syndiotactic polypropylene to form a matrix phase. Miscible polymer blends of iPP and sPP may be produced across the entire spectrum from 0 to 100 wt %. However, the percent crystallinity of the overall blend will usually be minimized between about 20 to 40 wt % iPP blended with 80 to 60 wt % sPP. For these blends, the percent crystallinity would usually be about 15 to 16%, and the average crystallite size in the sPP matrix phase would be about 140 to 149 A. Accordingly, the blends having about 20 to 40 wt % iPP also provide the best optical properties and the highest degree of transparency. It was noted in preparing the blends for this study that incorporating a small amount of random iPP copolymer with the sPP results in a significant reduction in injection molding cycle times. Accordingly, it was thought that by adding a small percentage, namely about 10 to about 30 wt % of the iPP random copolymer to the sPP matrix phase of the clear impact resin would produce a decrease in overall cycle times while maintaining good optical clarity and relatively high impact strengths at low temperatures.

Referring now to Table 2, a number of mechanical properties are collected for a series of sPP clear impact resins. These properties include injection molding cycle times, flexural modulus, tensile modulus, tensile strength, percent elongation, percent haze, and Gardner drop impact. In addition to the three clear impact sPP resin blends, an sPP homopolymer (EOD 93-06), and iPP random copolymer (Fina 6671XBB), and a iPP (Z9470)/Kraton G blend were also tested for comparison purposes. As shown in Table 2, the injection cycle times of blends containing 10, 20 or 30 wt % of the ransom iPP copolymer (6671XBB), are comparable to the cycle times of the iPP random copolymer control sample. Moreover, the clear impact sPP resin blends containing 10, 20, or 30 wt % of the iPP copolymer are better than the overall cycle time for the sPP homopolymer and the sPP impact resin produced by blending with ULDPE.

10 wt % or 60/20/20 wt % exhibited 8.7% haze and 5.6% haze, respectively, for a 1/16 inch thick plaque. The sample containing 30 wt % of the iPP random copolymer measured more than 3 times higher % haze in a 1/16 inch thick plaque than the other two clear impact sPP resin samples, but this sample was still comparable to many commercially available alternative impact resins based on Kraton G or the like.

Referring again to Table 2, it is also possible to look at the mechanical properties of the clear impact sPP blends. It is notable that in the two clear impact sPP blends which contain 10 and 20 wt % iPP random copolymer, the modulus

TABLE 2

| | EOD 93-06 | 80% EOD 93-06 + 20% EG 8150 Clear Impact sPP | 70% EOD 93-06 + 20% EG 8150 + 10% 6671XBB Clear Impact sPP II | 50% EOD 93-06 + 20% EG 8150 + 30% 6671XBB | Fina 6671XBB | 60% EOD 95-05 + 20% EG 8150 + 20% Z9470 Clear Impact SPP III | 80% Z9470 + 20% Kraton G |
|---|---|---|---|---|---|---|---|
| Melt Temp. (° F.) | 375 | 375 | 375 | 375 | 375 | 375 | |
| Injection Pressure (psi) | 6100 | 6200 | 6200 | 6000 | 3400 | 5100 | |
| Injection Time (sec) | 18 | 20 | 15 | 12 | 10 | 15 | |
| Cooling Time (sec) | 20 | 30 | 20 | 22 | 20 | 20 | |
| Overall Cycle Time (sec) | 38 | 50 | 35 | 34 | 30 | 35 | |
| Flexural Modulus (psi) | 52000 | 21800 | 26300 | 49700 | 86400 | 22300 | 25600 |
| Tensile Modulus, (psi) | 69700 | 2400 | 55500 | 77700 | 113000 | 30600 | 53000 |
| Tensile Stregth at Yield (psi) | 2170 | 1500 | 1710 | 2070 | 3300 | 1400 | 1780 |
| Tensile Strength at Break (psi) | 1700 | 1750 | 1770 | 2370 | 3270 | 1740 | 2310 |
| % Elong. at Yield | 10.8 | 14.3 | 11.4 | 10.6 | 10.0 | 15.4 | 14.8 |
| % Elong. at Break | 180 | 280 | 300 | 440 | 480 | 470 | 460 |
| % Haze 1/16" | 20.4 | 7.4 | 8.7 | 29.7 | 67.8 | 5.6 | 29.1 |
| Drop Impact (in-lb) @ Room Temp. | 230 | 200 | 196 | 220 | 200 | 200 | |
| @ -25° C. | 0 | 224 | 211 | 210 | 0 | 230 | |

Still referring to Table 2, it can be shown that the optical properties of clear impact sPP resin blends with 10 or 20 wt % of iPP random copolymer is either comparable to or better than that provided by the 80/20 wt % sPP/ULDPE blend tested previously. As shown here, the 80/20 wt % sPP/ULDPE blend exhibited a 7.4% haze on a 1/16 inch thick plaque. The sPP/ULDPE/iPP blends in proportions of 70/20/ properties, the tensile strength and the elongation percentages are quite comparable to those of commercially available impact resins derived from Kraton G or the like. Additionally, as shown here, the clear impact sPP blends now exhibit outstanding Gardner drop impact properties at both room temperature and at reduced temperatures as low as −25° C.

While a preferred embodiment of the invention has been shown and described herein, modifications may be made by one skilled in the art without departing from the spirit and the teachings of the invention. The embodiments described herein are exemplary only, and are not intended to be limiting. Many variations, combinations, and modifications of the invention disclosed herein are possible and are within the scope of the invention. Accordingly, the scope of protection is not limited by the description set out above, but is defined by the claims which follow, that scope including all equivalents of the subject matter of the claims.

What is claimed is:

1. A thermoplastic polymer blend consisting essentially of:
    a syndiotactic polypropylene homopolymer; and
    an ultra low density polyethylene.

2. A thermoplastic polymer blend, comprising a syndiotactic polypropylene homopolymer; and an ultra low density polyethylene and further comprising an isotactic polypropylene random copolymer.

3. A thermoplastic polymer blend according to claim 1, wherein the ultra low density polyethylene comprises less than about 50 wt % of the polymer blend.

4. A thermoplastic polymer blend according to claim 3, wherein the ultra low density polyethylene comprises about 10 to about 30 wt % of the polymer blend.

5. A thermoplastic polymer blend according to claim 3, wherein the ultra low density polyethylene comprises about 18 to about 22 wt % of the polymer blend.

6. A thermoplastic polymer blend according to claim 2, wherein the random copolymer comprises less than about 50 wt % of the polymer blend.

7. A thermoplastic polymer blend according to claim 6, wherein the random copolymer comprises about 10 to about 30 wt % of the polymer blend.

8. A thermoplastic polymer blend according to claim 6, wherein the random copolymer comprises about 18 to about 22 wt % of the polymer blend.

9. A thermoplastic polymer blend according to claim 1, having a Gardner drop impact (ASTM D5420) value of at least about 200 in-lb. at −25° C. for a 1/8 inch plaque and a haze value of less than about 10% for a 1/16 inch plaque.

10. A thermoplastic polymer blend consisting essentially of:
    about 35 to about 99.9 wt % of a syndiotactic polypropylene homopolymer; and
    about 0.1 to about 65 wt % of an ultra low density polyethylene.

11. A thermoplastic polymer blend according to claim 10, wherein the ultra low density polyethylene is an ethylene copolymer having a density of about 0.85 to about 0.93 g/ml and melt index of about 0.25 to about 50 g/10 min.

12. A thermoplastic polymer blend according to claim 10, wherein the ultra low density polyethylene comprises about 15 to about 25 wt % of the polymer blend.

13. A thermoplastic polymer blend according to claim 10, wherein the ultra low density polyethylene comprises about 18 to about 22 wt % of the polymer blend.

14. A thermoplastic polymer blend according to claim 10, wherein the polypropylene random copolymer comprises about 10 to about 30 wt % of the polymer blend.

15. A thermoplastic polymer blend comprising about 35 to about 99.9 wt % of a syndiotactic polypropylene homopolymer; and about 0.1 to about 30 wt % of an ultra low density polyethylene and further comprising a polypropylene random copolymer comprising about 15 to about 25 wt % of the polymer blend.

16. A thermoplastic polymer blend according to claim 10, having a Gardner drop impact (ASTM D5420) value of at least about 200 in-lb. at −25° C. for a 1/8 inch plaque and a haze value of less than about 10% for a 1/16 inch plaque.

17. A method of making a thermoplastic polymer blend comprising the steps of:
    providing a syndiotactic polypropylene homopolymer;
    mechanically blending the syndiotactic polypropylene homopolymer with an ultra low density polyethylene; and
    extruding the syndiotactic polypropylene homopolymer and the ultra low density polyethylene to form a substantially homogenous polymer blend, wherein the polymer blend consists essentially of the syndiotactic polypropylene homopolymer and the ultra low density polyethylene.

18. A method of making a thermoplastic polymer blend comprising the steps of providing a syndiotactic polypropylene homopolymer; mechanically blending the syndiotactic polypropylene homopolymer with an ultra low density polyethylene; and extruding the syndiotactic polypropylene homopolymer and the ultra low density polyethylene to form a substantially homogeneous polymer blend and further comprising the step of mechanically blending the syndiotactic polypropylene homopolymer with an isotactic polypropylene random copolymer prior to extruding.

19. A method according to claim 17, further comprising the step of forming the substantially homogeneous polymer blend into a film.

20. A method according to claim 17, further comprising the step of forming the substantially homogeneous polymer blend into an injection molded article.

* * * * *